United States Patent
Hampton

(10) Patent No.: US 8,108,419 B2
(45) Date of Patent: Jan. 31, 2012

(54) VIRTUALLY APPLYING MODIFICATIONS

(75) Inventor: Mark Carl Hampton, Newtown (AU)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 12/138,666

(22) Filed: Jun. 13, 2008

(65) Prior Publication Data

US 2009/0313218 A1    Dec. 17, 2009

(51) Int. Cl.
*G06F 17/30* (2006.01)
(52) U.S. Cl. .................................................. 707/769
(58) Field of Classification Search .............. 707/609, 707/769, 705, 802
See application file for complete search history.

(56) References Cited

U.S. PATENT DOCUMENTS

| | | | |
|---|---|---|---|
| 5,454,101 A * | 9/1995 | Mackay et al. | 1/1 |
| 7,043,472 B2 | 5/2006 | Aridor et al. | |
| 2004/0230903 A1 | 11/2004 | Elza et al. | |
| 2007/0112851 A1 | 5/2007 | Tomic et al. | |
| 2007/0192337 A1 * | 8/2007 | Chandrasekar Iyer et al. | 707/100 |

* cited by examiner

*Primary Examiner* — Fred I Ehichioya
(74) *Attorney, Agent, or Firm* — Holland & Knight LLP; Brian J Colandreo, Esq.; V. Raman Bharatula, Esq.

(57) ABSTRACT

A first data set having a first hierarchical structure is identified. A second data set that represents a modification of at least a portion of the first data set is also identified. A query is performed over at least a portion of the first data set and at least a portion of the second data set, thereby generating a query results set. A representation of at least a portion of the first data set and at least a portion of the second data set is provided, based upon, at least in part, the query results set.

20 Claims, 10 Drawing Sheets

_US 8,108,419 B2_

VIRTUALLY APPLYING MODIFICATIONS

BACKGROUND OF THE INVENTION

This disclosure relates to data modification tools, and more particularly to virtually applying modifications.

In the present internet and electronic communication age, development activities occur at a feverish pace. Websites are modified almost constantly, software development moves quickly, and content data is updated regularly. When updating the behavior or content of software, data files, or web pages, often multiple users will be involved in making modifications to the various files that make up the website. Often, each user may desire to preview their modifications before permanently making them to an active website, for example. Also, modifications may be made well in advance of making them active, but development work needs to progress on these modifications with the ability to see what the final product is going to look like. This is typically achieved by copying the entire set of files and their hierarchy from their original, active location to generate a second set upon which to make modifications. This has the disadvantages of using a lot of storage space, not allowing for keeping track of the changes or which files have been changed, and not allowing for testing the compatibility of any one user's changes against the changes of others or against the original.

BRIEF SUMMARY OF THE INVENTION

In a first implementation, a method includes identifying a first data set having a first hierarchical structure. A second data set that represents a modification of at least a portion of the first data set is also identified. A query is performed over at least a portion of the first data set and at least a portion of the second data set, thereby generating a query results set. A representation of at least a portion of the first data set and at least a portion of the second data set is provided, based upon, at least in part, the query results set.

According to another implementation, a computer program product may include a computer readable medium having a plurality of instructions stored on it. When executed by a processor, the plurality of instructions cause the processor to perform operations including identifying a first data set having a first hierarchical structure. A second data set is identified. The second data set represents a modification of at least a portion of the first data set. A query is performed over at least a portion of the first data set and at least a portion of the second data set, thereby generating a query results set. A representation of at least a portion of the first data set and at least a portion of the second data set is provided, based upon, at least in part, the query results set.

In another implementation, a computing system includes, at least one processor, and at least one memory architecture coupled with the at least one processor. A first software module, executed on the at least one processor and the at least one memory architecture, is configured to identify a first data set having a first hierarchical structure. A second software module, executed on the at least one processor and the at least one memory architecture, is configured to identify a second data set, wherein the second data set represents a modification of at least a portion of the first data set. A third software module, executed on the at least one processor and the at least on memory architecture, is configured to perform a query over at least a portion of the first data set and at least a portion of the second data set, thereby generating a query results set. A fourth software module, executed on the at least one processor and the at least one memory architecture, is configured to provide a representation of at least a portion of the first data set and at least a portion of the second data set, based upon, at least in part, the query results set.

The details of one or more implementations are set forth in the accompanying drawings and the description below. Other features and advantages will become apparent from the description, the drawings, and the claims.

DETAILED DESCRIPTION OF THE INVENTION

Figure 1:
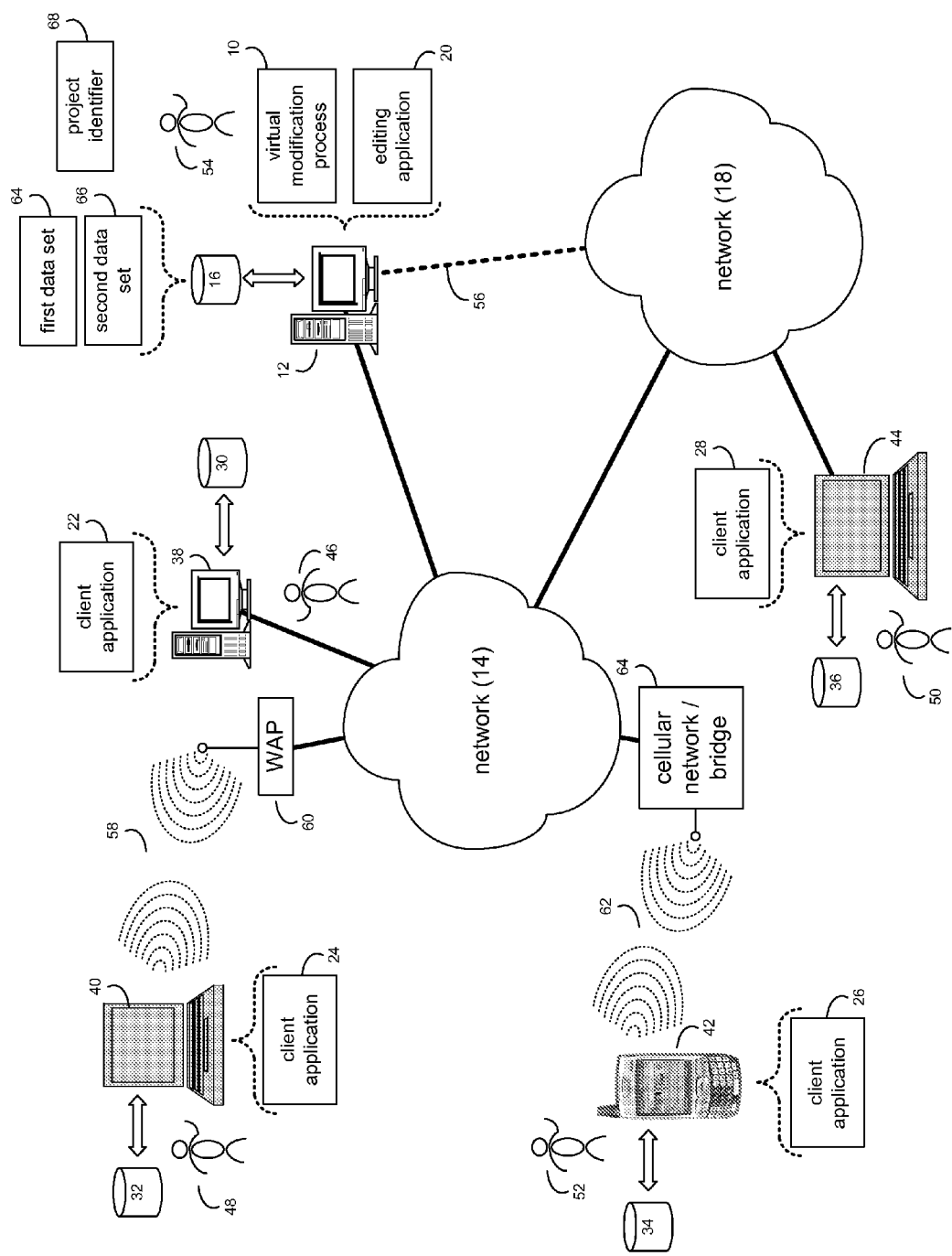
FIG. 1 diagrammatically depicts a virtual modification process and an editing application coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown virtual modification process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® Netware®; or Red Hat® Linux®, for example (Microsoft and Windows are trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both). In addition/as an alternative, the virtual modification process may reside on and may be executed by one or more client electronic devices, such as a personal computer, a notebook computer, and a personal digital assistant, for example.

As will be discussed in greater detail below, virtual modification process 10 may identify a first data set and a second data set. The first data set may have a first hierarchical structure. The second data set may represent a modification of at least a portion of the first data set. Virtual modification process 10 may perform a query over at least a portion of the first data set and at least a portion of the second data set, thereby generating a query results set. Virtual modification process 10 may provide a representation of at least a portion of the first data set and at least a portion of the second data set, based upon, at least in part, the query results set. As such, virtual modification process 10 may, for example, allow modifications (e.g., which may be represented by at least a portion of the second data set) to be virtually applied.

The instruction sets and subroutines of virtual modification process 10, which may be configured as one or more software modules, and which may be stored on storage device 16 coupled to server computer 12, may be executed by one or more processors (not shown) and one or more memory architectures (not shown) incorporated into server computer 12. Storage device 16 may include but is not limited to: a hard disk drive; a solid state drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14. (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute one or more editing applications (e.g., editing application 20), examples of which may include but are not limited to a Hypertext Markup Language (HTML) editor (e.g., IBM® WebSphere®, Adobe® Dreamweaver®, Microsoft FrontPage®), an Extensible Markup Language (XML) editor (e.g., IBM Xeena, XMLBuddy™ plug-in for Eclipse™), or a file editor (e.g., Microsoft Windows Explorer, Microsoft Office Suite). IBM and WebSphere are registered trademarks of International Business Machines, Inc. in the United states, other countries, or both; Adobe and Dreamweaver are registered trademarks of Adobe Systems Inc. in the United States and/or other countries; FrontPage is a registered trademark of Microsoft Corporation in the United States, other countries, or both; XMLBuddy is a trademark of Bocaloco Software LLC in the United States, other Countries, or both; Eclipse is a trademark of eclipse.org in the United States, other countries, or both. Editing application 20 may interact with one or more client applications (e.g., client applications 22, 24, 26, 28), for example, allowing editing to be conducted remotely. Examples of client applications may include, but are not limited to, web browsers such as Microsoft Internet Explorer®, Mozilla® Firefox®, and Opera Software® web browsers (Internet Explorer is a trademark of Microsoft Corporation in the United States, other countries, or both; Mozilla and Firefox are registered trademarks of Mozilla Foundation Corporation in the United States, other countries, or both; and Opera Software is a registered trademark of Opera Software AS. Corporation in the United States, other countries, or both). Alternatively, client applications 22, 24, 26, 28 may be proprietary client applications developed to work in conjunction with editing application 20. Virtual modification process 10 may be a stand-alone application that interfaces with editing application 20 or may be an applet/application that is executed within editing application 20.

The instruction sets and subroutines of editing application 20, which may be stored on storage device 16 coupled to server computer 12, may be executed by one or more processors (not shown) and one or more memory architectures (not shown) incorporated into server computer 12.

As mentioned above, in addition/as an alternative to being a server-side application residing on server computer 12, the virtual modification process may be a client-side application (not shown) residing on one or more storage devices (e.g., storage devices 30, 32, 34, 36, respectively) coupled to one or more client electronic devices (e.g., client electronic devices 38, 40, 42, 44, respectively). As such, the client-side virtual modification process may be a stand-alone application that interfaces with a client application (e.g., client applications 22, 24, 26, 28) or editing application 20, or may be an applet/application that is executed within a client application (e.g., client applications 22, 24, 26, 28). As such, the virtual modification process may be a client-side process, a server-side process, or a hybrid client-side/server-side process, which may be executed, in whole or in part, by server computer 12, and/or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example.

Users 46, 48, 50, 52, 54 may engage in modifying or editing HTML, XML, or other hierarchical data sets, e.g., which may include accessing and/or interacting with editing application 20. A user (e.g., users 46, 48, 50, 52) may access editing application 20 through a device on which a client application (e.g., client applications 22, 24, 26, 28) is executed, namely client electronic devices 38, 40, 42, 44, for example. In such a case, users 46, 48, 50, 52 may access editing application 20 directly through network 14 or through secondary network 18. Further, server computer 12 (i.e., the computer that executes editing application 20) may be connected to network 14 through secondary network 18, as illustrated with phantom link line 56. Alternatively, a user (e.g., user 54) may access editing application 20 at server computer 12 (i.e., where editing application 20 resides and is executed) utilizing a local display (not shown) and various user input devices (not shown) such as a keyboard and/or mouse.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 58 established between laptop computer 40 and wireless access point (i.e., WAP) 60, which is shown directly coupled to network 14. WAP 60 may be, for example, an IEEE 802.11a, 802.11b, 802.11g, Wi-Fi, and/or Bluetooth device that is capable of establishing wireless communication channel 58 between laptop computer 40 and WAP 60. Personal digital assistant 42 is shown wirelessly coupled to network 14 via wireless communication channel 62 established between personal digital assistant 42 and cellular network/bridge 64, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Redhat Linux, or a custom operating system (Windows CE is a trademark of Microsoft Corporation in the United States, other countries, or both).

For the purpose of the following description client application 22 will be discussed for illustrative purposes. However, this should not be construed as a limitation on this disclosure as other client applications (e.g., client applications 24, 26, 28) and/or direct interaction with editing application 20 and/or virtual modification process 10 (e.g., by user 54 accessing server computer 12) may be equally utilized.

Figure 2:
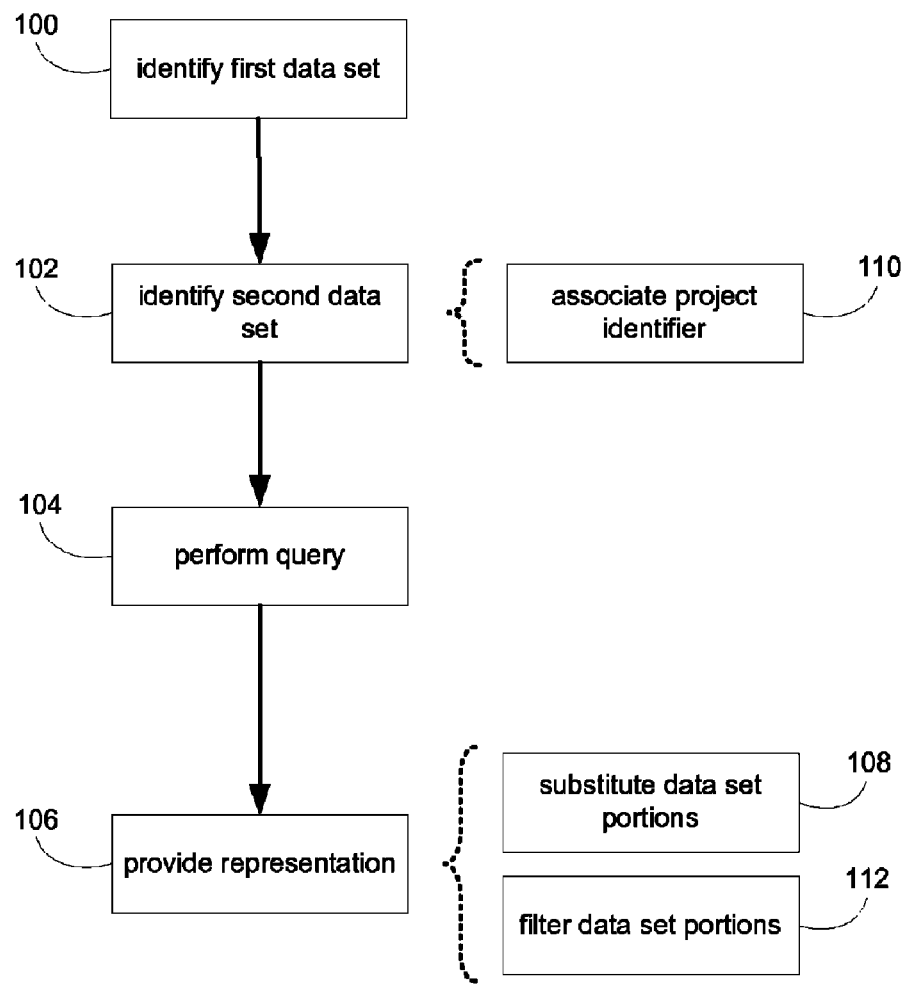
FIG. 2 is a flowchart of a process executed by the virtual modification process of FIG. 1.

Referring also to FIG. 2, virtual modification process 10 may identify 100 a first data set, which may have a first hierarchical structure. Virtual modification process 10 may further identify 102 a second data set. The second data set may represent a modification of at least a portion of the first data set. Virtual modification process 10 may perform 104 a query over at least a portion of the first data set and at least a portion of the second data set, thereby generating a query results set. Virtual modification process 10 may also provide 106 a representation of at least a portion of the first data set and at least a portion of the second data set, based upon, at least in part, the query results set.

Figure 3:
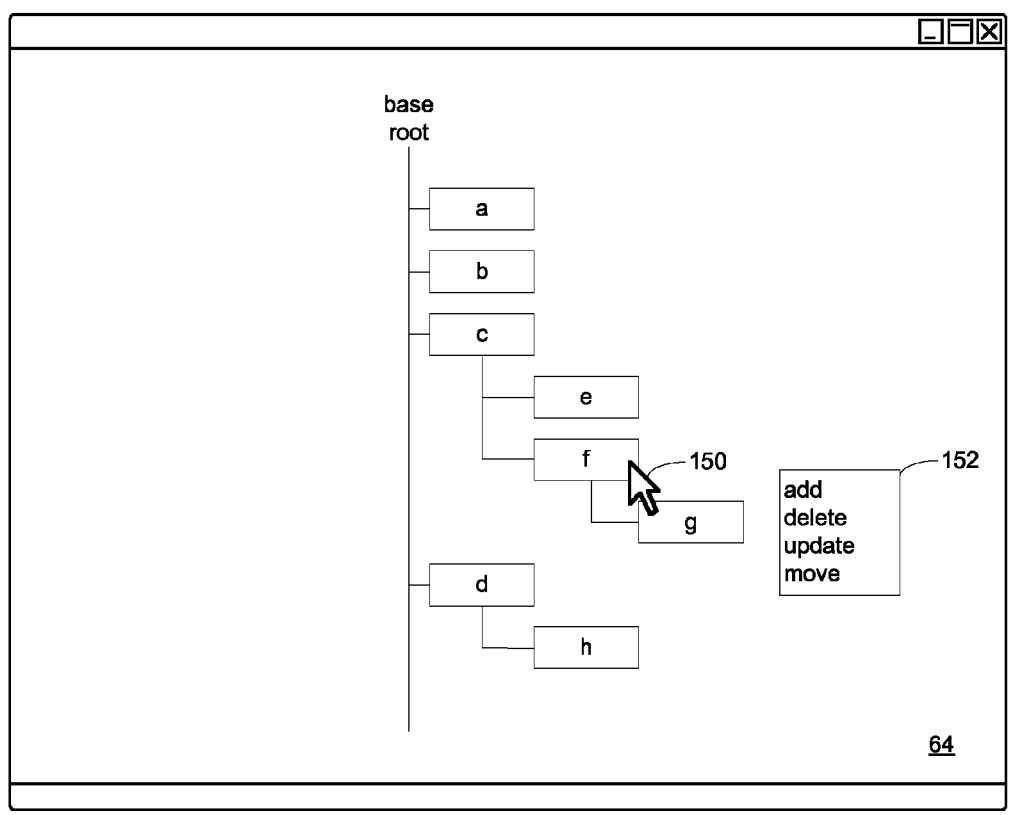
FIG. 3 diagrammatically depicts a display screen rendered by one or more of a client application, the editing application and/or the virtual modification process of FIG. 1.

For example, and referring also to FIG. 3, a first data set (e.g., first data set 64) may include one or more elements (e.g., element a, element b, element c, element d, element e, element f, element g, element h) which may include one or more data files, portions of a data file, documents, or the like. First data set 64 may, or example, include one or more files and documents (e.g., HTML and/or XML documents) which may make up a website, e.g., which may include one or more webpages, in which each of the one or more webpages may include one or more elements (e.g., menus, frames, text, graphics, and the like). First data set 64 may have a hierarchical structure. For example, as shown, one or more elements (e.g., elements a, b, c, and d) may reside at a first hierarchical level (e.g., as nodes of the base root). Element e and element f may be children of element c (e.g., being nodes of a branch from element c). Further, element g may be a child of element f (e.g., being a node of a branch from element f), thereby also being a grandchild of element c.

A user (e.g., user 46) may modify first data set 64 (e.g., using one or more of virtual modification process 10, editing application 20, and client application 22). Continuing with the above-stated example in which first data set 64 may include one or more files and documents which may make up a website, user 46 may modify first data set 64, e.g., to update the website. For example, user 46 (via one or more of virtual modification process 10, editing application 20, and client application 22) may add one or more elements to element f, which may be a child of element c. For example, user 46 may select, via onscreen pointer 150 (which may be controlled by a pointing device, such as a mouse; not shown), element f from a visual display rendered by editing application 20 (alone or in combination with one or more of virtual modification process 10, and client application 22) element f from first data set 64. Selecting element f and "right clicking" may result in editing application 20 rendering menu 152. While menu 152 is shown including four options (namely, add, delete, update, and move), this is intended for illustrative purposes only, as the number and nature of options may vary according to editing application, and user need.

Figure 4:
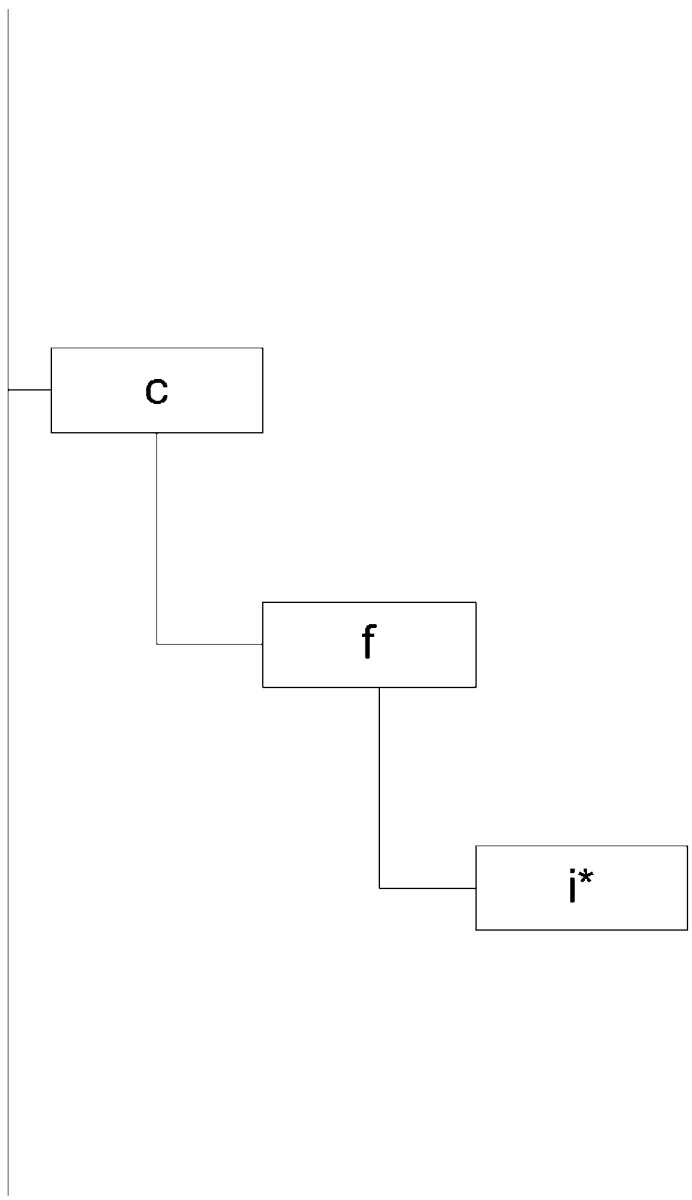
FIG. 4 diagrammatically depicts a second data set included within a second hierarchical structure.

Referring also to FIG. 4, user 46 may select "add" from within menu 152, resulting in one or more of virtual modification process 10 and/or editing application 20 creating second data set 66, which may represent a modification of first data set 64. Second data set 66 may have a second hierarchical structure (e.g., including one or more nodes off of work root), in which at least a portion of the second hierarchical structure may correspond to at least a portion of the first hierarchical structure (e.g., via a node represented by element c). Editing application 20 (alone or in conjunction with virtual modification process 10) may add an element (e.g., element i) as a child of element f to work root. User 46 may define element i in a conventional manner (e.g., by one or more of writing code corresponding to desired features, providing pointers to desired features, inserting desired features, etc., depending upon the nature of first and second data sets 64, 66). Element i may be indicated as an edited item (e.g., by the designation "i*"). In order to prevent editing conflicts (e.g., in the case of multiple users simultaneously editing base root), editing application 20 (alone or in combination with virtual modification process 10) may lock the parent node (e.g., element f), such that element f of first data set 64 may not be moved or deleted, as a child of element f has been added.

Figure 5:
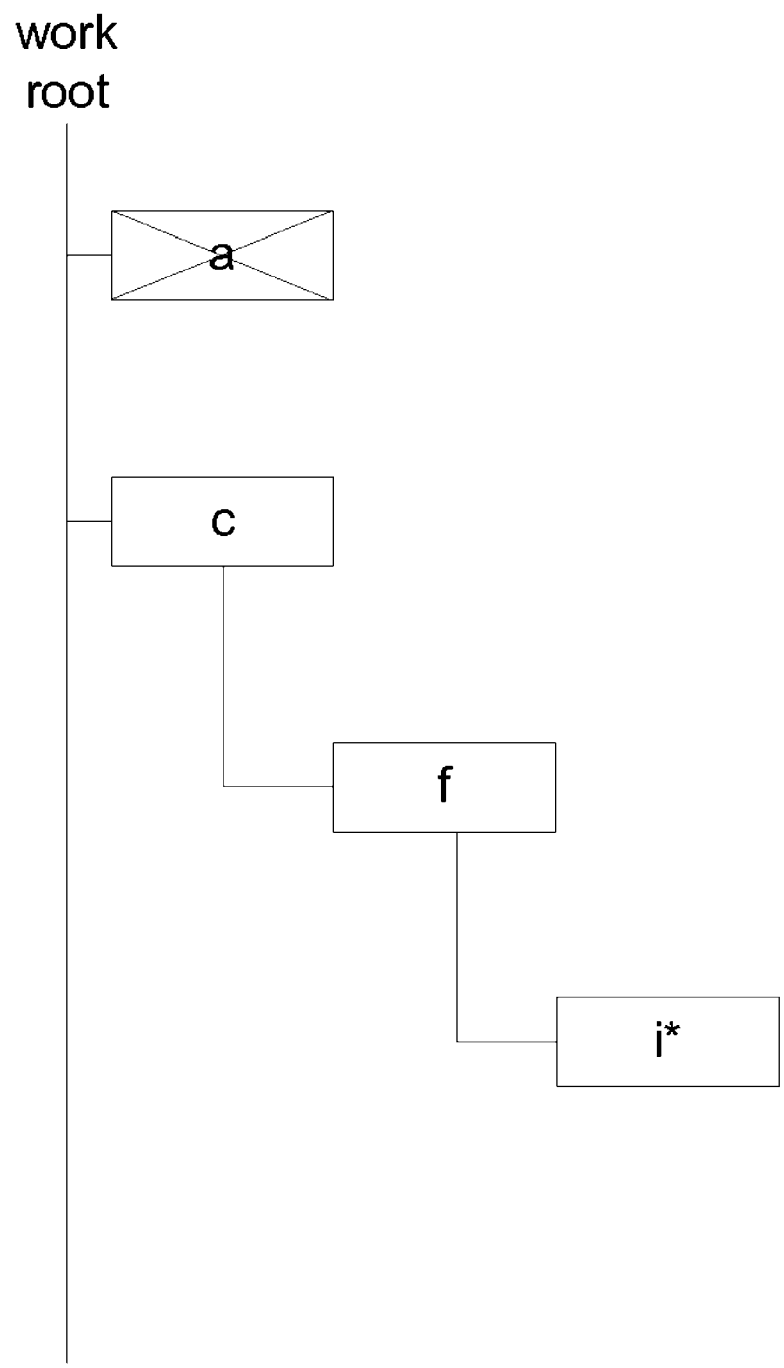
FIG. 5 diagrammatically depicts a second data set included within a second hierarchical structure.
Figure 6:
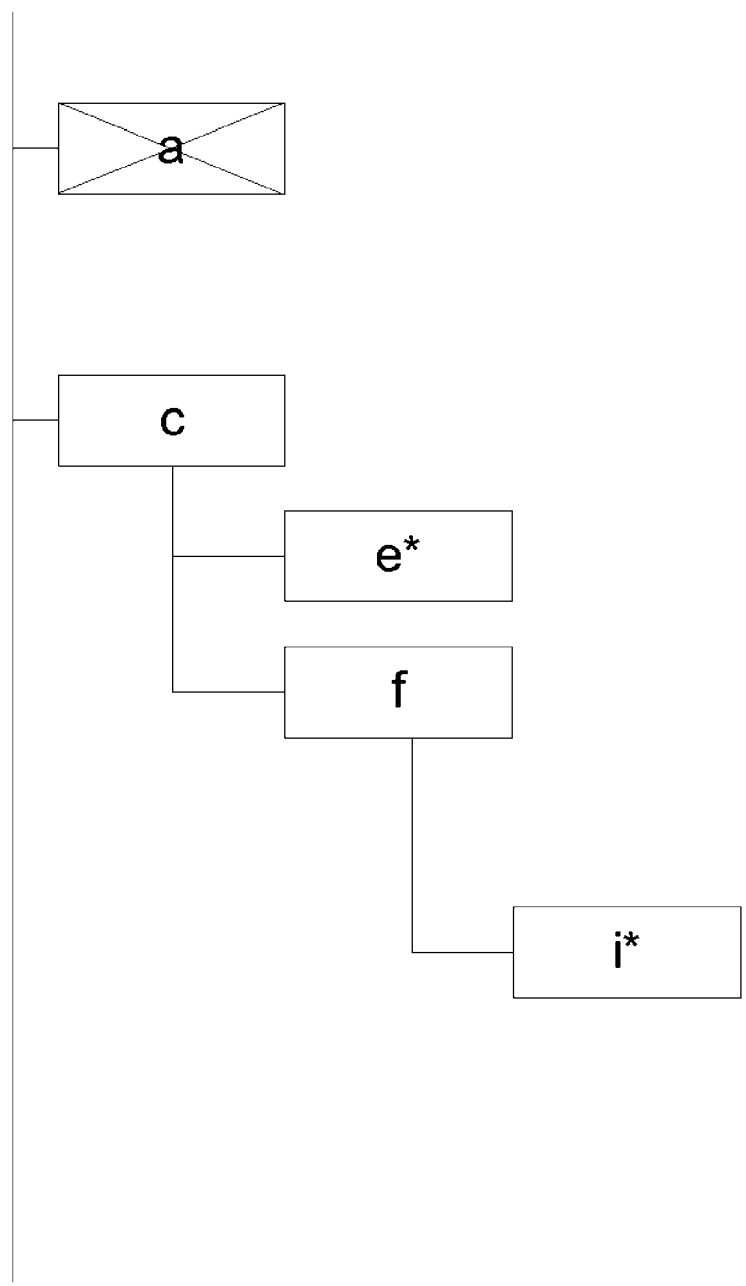
FIG. 6 diagrammatically depicts a second data set included within a second hierarchical structure.

In a similar manner, second data set 66 may reflect the deletion of one or more elements from first data set 64. For example, user 46 may select, via onscreen pointer 150, element a from first data set 64. User 46 may select delete from within menu 152. Referring also to FIG. 5, selecting "delete" from within menu 152 may result in editing application 20 (alone or in combination with virtual modification process 10) adding a deleted node stub to work root (e.g., as indicated by x'ed out element a). As with adding a new element, element a in base root may be locked against being moved or deleted to prevent editing conflicts.

Continuing with the above-stated example, user 46 may update one or more elements (e.g., element e) by selecting "update" from within menu 152. Editing application 20 (alone or in conjunction with virtual modification process 10) may copy element e to work root (e.g., as a child of element c and may allow user 46 to modify element e as desired. Element e in work root may be indicated as an edited item (e.g., by the designation "e*"). As discussed above, in order to prevent editing conflicts, element e in base root may be locked against being moved or deleted.

Figure 7:
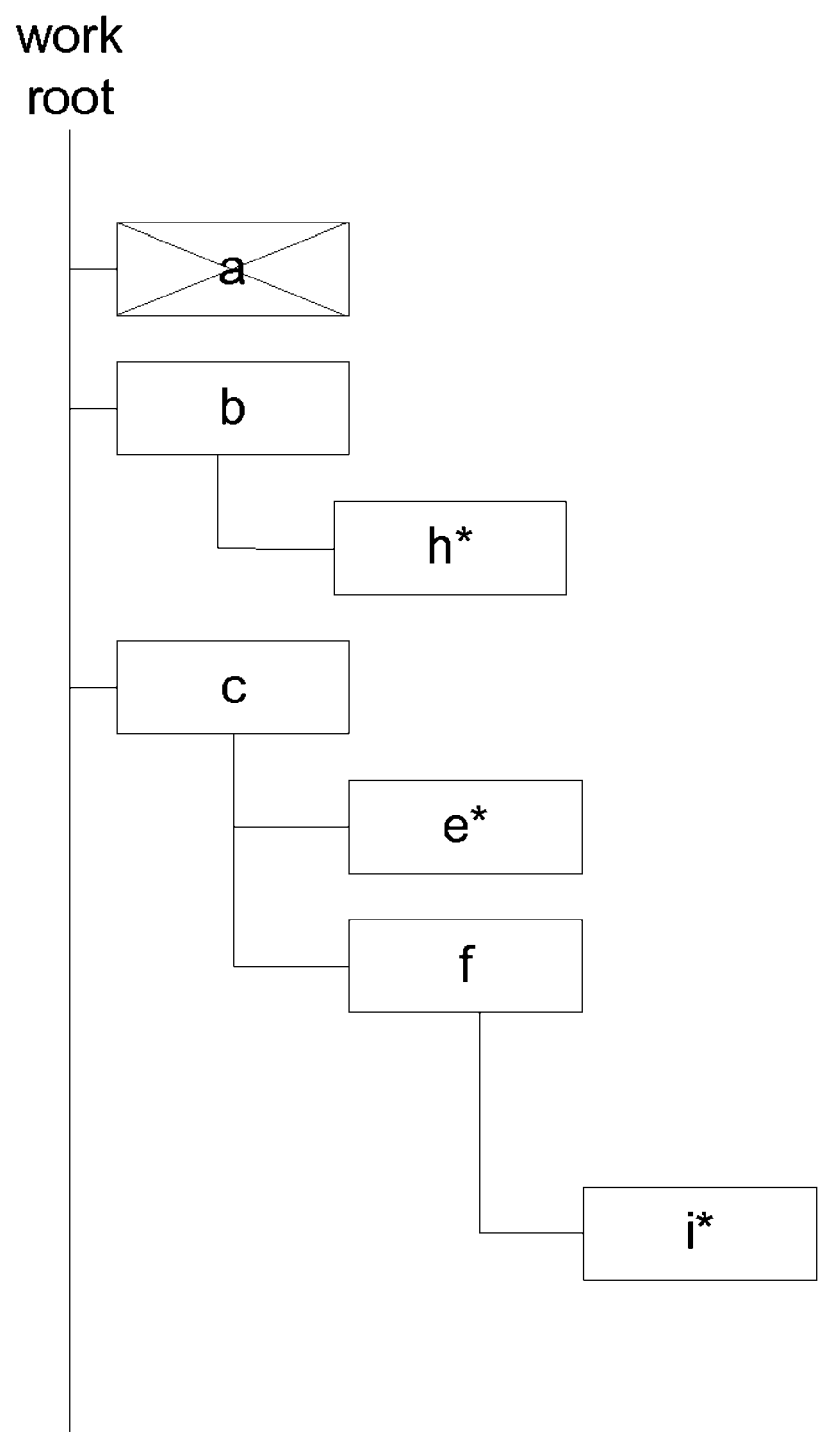
FIG. 7 diagrammatically depicts a second data set included within a second hierarchical structure.

Continuing with the above stated example, editing application 20 (alone or in combination with virtual modification process 10) may also allow use 46 to move one or more elements. For example, user 46 may select, via onscreen pointer 150, element h and "right click", resulting in editing application 20 (alone or in combination with virtual modification process 10 and/or client application 22) rendering menu 152. User 46 may select, via onscreen pointer, "move" from within menu 152. Editing application 20 (alone or in conjunction with virtual modification process 10) may allow user 46 to drag and drop element h to a desired location (e.g., to element b). As shown in FIG. 7, moving element h may result in element h being defined as a child of element b within second data set 66. As discussed above, editing application (alone or in conjunction with virtual modification process 10) may lock all parent nodes (e.g., element a, element b, element c, and element d) of first data set 64, against being moved or deleted. Non-leaf items (e.g., parent elements, such as element a, element b, element c, and element d) may be moved in a corresponding manner.

Figure 8:
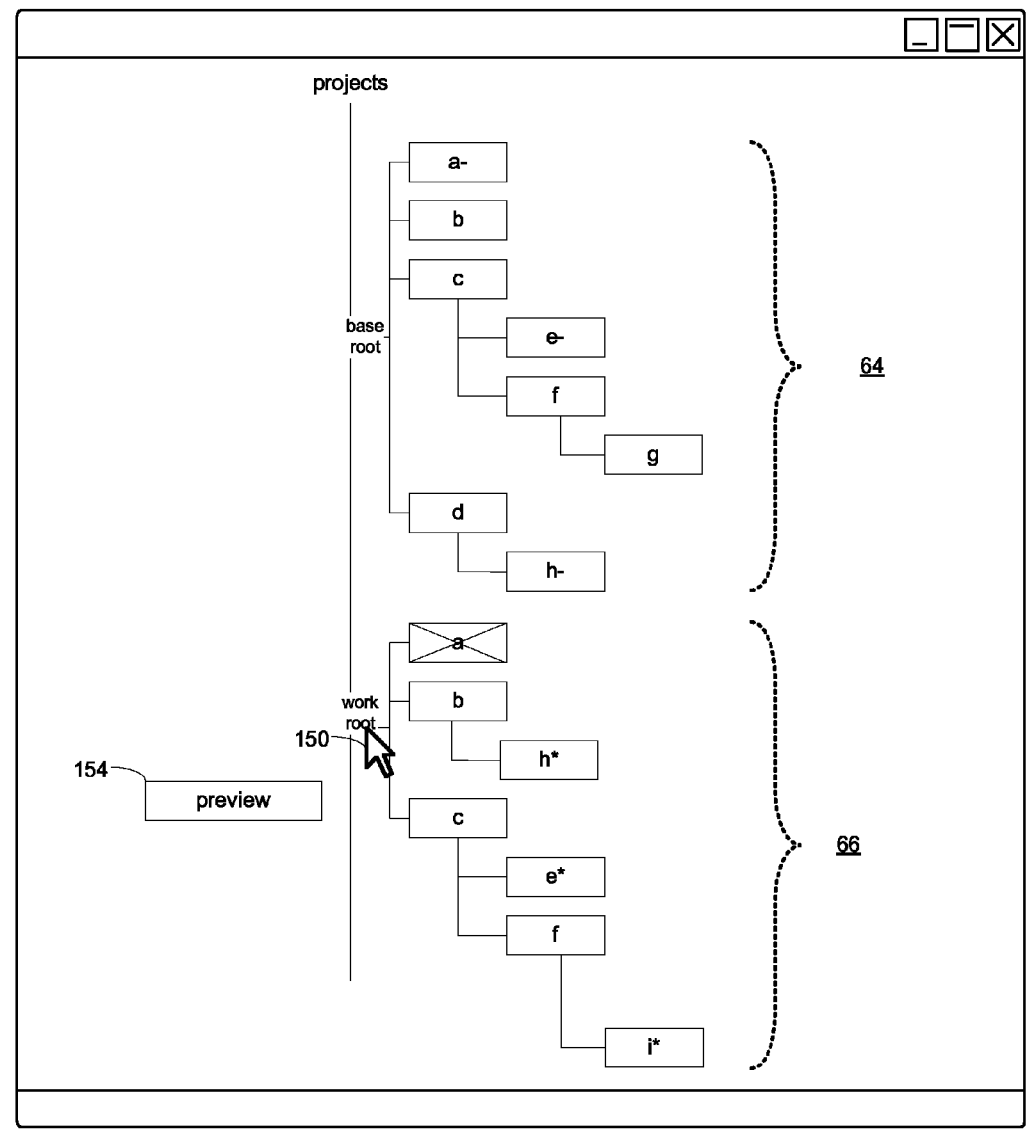
FIG. 8 diagrammatically depicts a first data set and a second data set.

Virtual modification process may identify 100 first data set 64 and may identify 102 second data set 66. For example, and referring also to FIG. 8, virtual modification process 10 (alone or in conjunction with one or more of editing application 20 and client application 22) may render display screen 200, including first data set 64 and second data set 66, e.g., as nodes on "projects" file structure. User 46 may select, via onscreen pointer 150, first data set 64 and second data set 66 (e.g., by "ctrl clicking" first data set 64 and second data set 66), resulting in virtual modification process identifying 100 first data set 64 and identifying 102 second data set 66. User 46 may "right click" selected first data set 64 and second data set 66, resulting in virtual modification process (alone or in conjunction with one or more of editing application 20 and client application 22) rendering menu 154. While menu 154 is shown including only a single option (namely, "preview"), this is for illustrative purposes only and should not be construed as a limitation of this disclosure as the number and nature of options within menu 154 may vary according to user need and design criteria. Additionally, while the illustrative example utilizes a windows-based implementation, a text-based, or other suitable, interface may be equally employed.

Figure 9:
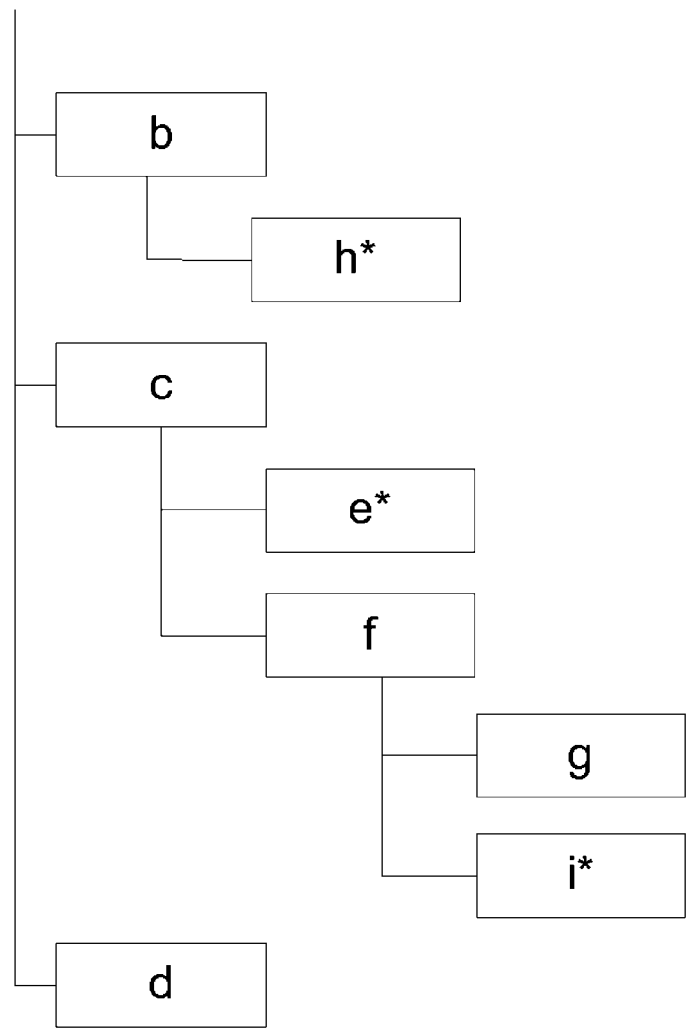
FIG. 9 diagrammatically depicts a modified data set.

Selecting "preview" from within menu 154 may result in virtual modification process 10 performing 104 a query over one or more of at least a portion of the first hierarchical structure and at least a portion of the second hierarchical structure, thereby generating a query results set. Virtual representation process 10 may perform 104 the query using a hierarchical query language, such as XPath in an embodiment in which first data set 64 and second data set 66 include XML documents. Performing 104 the query may include performing the query over base root and work root. The query may exclude all nodes in base root which have been modified (e.g., deleted element a, updated element e, and moved element h). The modified nodes of base root may be excluded based upon, at least in part, an indicator in base root that the nodes have been modified (e.g., as indicated as "a-", "e-", and "h-" designators, shown in FIG. 8). Further, the query may include all new and modified nodes from work root (e.g., as indicated as "et*", "h*", and "i*" in work root). Referring also to FIG. 9, performing 104 a query over one or more of at least a portion of the first hierarchical structure and at least a portion of the second hierarchical structure may generate query results set 68.

Further, selecting "preview" from within menu 154 may result in virtual modification process 10 providing 106 a representation of at least a portion of first data set 64 and at least a portion of second data set 66 based upon, at least in part, query results set 68. Providing 106 a representation of, and/or performing 104 a query over, at least a portion of first data set 64 and at least a portion of second data set 66 may include substituting 108 at least a portion of the first data set with at least a portion of the second data set. For example, the elements of second data set 66 which represent modified elements of first data set 64 (e.g., updated element e* and moved element h*) may be substituted for the original elements of first data set 64 (e.g., element e and element h). Virtual modification process 10 may provide 106 a representation of at least a portion of first data set 64 and at least a portion of second data set 66, based upon, at least in part, query results set 68. For example, in an embodiment in which first data set 64 and second data set 66 includes files and/or documents making up at least a portion of a website, providing 106 a representation of at least a portion of first data set 64 and at least a portion of second data set 66 (e.g., query results set 68) may include rendering at least a portion of the website defined, at least in part, by query results set 68.

According to a further embodiment, at least a portion of the second data set may be included within at least a portion of the first hierarchical structure. The second data set may include a project identifier associated 110 with one or more elements included within the second data set. Similar to the preceding embodiment, user 46 may modify first data set 64, e.g., by "right clicking" and element of first data set 64 and selecting a desired option from menu 152. At least a portion of the one or more modifications to first data set 64 (i.e., second data set 66) may be included within the first hierarchical structure.

Figure 10:
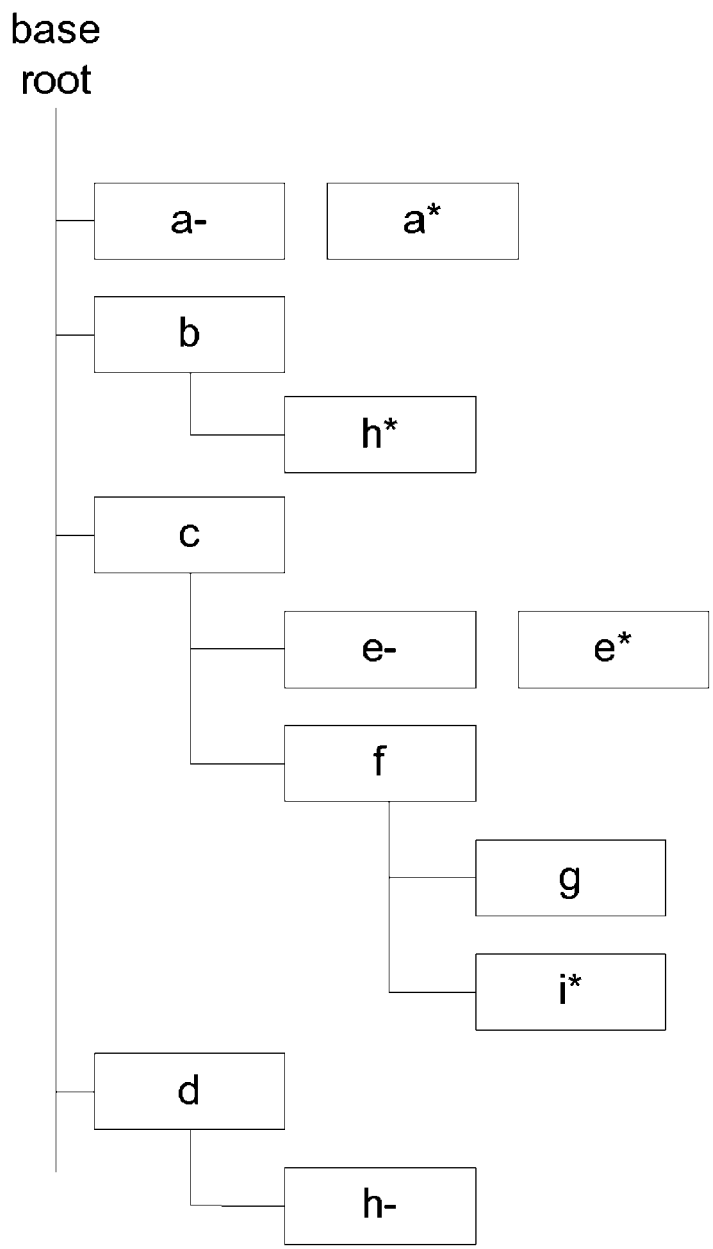
FIG. 10 diagrammatically depicts a first data set and a second data set included within a first hierarchical structure.

Corresponding to the previous embodiment, and referring also to FIG. 10, user 46 may add element i as a child of element f. Editing application 20 (alone or in conjunction with virtual modification process 10) may accordingly add element it (e.g., in which element i includes a project identifier "*" associated therewith) to the first hierarchical structure as a child of element f. Similarly, user 46 may delete element a. Editing application 20 (alone or in conjunction with virtual modification process 10) may mark element a of first data set 64 as being modified (e.g., by designating element a as "a-") and may add element a* (which may indicate the deletion of element a) to the first hierarchical structure at the node associated with element a. Further, editing application 20 (alone or in conjunction with virtual modification process 10) may update element e. Element e of first data set 64 may be designated "e-", indicating a modification of the element. New element "e*" may be added to the first hierarchical structure at the node associated with element e. Further, editing application 20 (alone or in conjunction with virtual modification process 10) may move element h. For example, as shown, element h of first data set 64 may be indicated as being modified (e.g., by the designation "h-"). Element h may be indicated as being moved to be a child of element be, e.g., by associating a copy of element h (e.g., indicated as being associated with second data set 66 by designation "h*") as a child of element b.

Virtual modification process 10 may perform 104 a query over the first hierarchical structure, e.g., using a hierarchical query language, thereby generating query results set 68. Virtual modification process 10 may further provide 106 a representation of at least a portion of first data set 64 and at least a portion of second data set 66 based upon, at least in part, query results set 68. Further, providing a representation of, and/or performing 104 a query over, at least a portion of first data set 64 and at least a portion of second data set 66 may include substituting 108 at least a portion of second data set 66 for at least a portion of first data set 64. For example, updated element e (e.g., "e*") of second data set 66 may be substituted for original element e (e.g., "e-") of first data 64. Substituting 108 at least a portion of first data set 64 with at least a portion of second data set 66 may include filtering 112 at least a portion of first data set 64 and at least a portion of second data set 66. For example, virtual modification process 10 may filter out at least a portion of first data set 64 based upon, at least in part, an indication that one or more elements of first data set have been modified (e.g., a-, e-, and h-). Similarly, virtual modification process 10 may filter in at least a portion of second data set 66 based upon, at least in part, an indicator that one or more elements belong to second data set 66 (e.g., a*, e*, h*, and i* based upon associated 110 project identifier "*").

Also similar to the first described embodiment, virtual modification process 10 may provide 106 a representation of at least a portion of first data set 64 and at least a portion of second data set 66, e.g., by rendering a query results set including at least a portion of first data set 64 and at least a portion of second data set 66. Rendering the query results set may include, e.g., rendering a website including one or more webpages and/or elements of one or more webpages defined, at least in part, by the modified data set.

The editing (i.e., adding, deleting, updating, and moving) processes herein have been provided for illustrative purposes only, and should not be construed as being a limitation on the present disclosure as the exact manner by which the second data set (which may represent a modification of at least a portion of the first data set) may vary depending upon the type, nature, and configuration of the editing application and/or the virtual modification process. Other suitable embodiments will be understood by those having skill in the art.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
   identifying, via one or more computing devices, a first data set having a first hierarchical structure;
   identifying, via the one or more computing devices, a second data set, wherein the second data set represents a modification of at least a portion of the first data set, and wherein the second data set has a second hierarchical structure, at least a portion of the second hierarchical structure corresponding to at least a portion of the first hierarchical structure;
   performing, via the one or more computing devices, a query over at least a portion of the first data set and at least a portion of the second data set, thereby generating a query results set, wherein performing the query over at least a portion of the first data set and at least a portion of the second data set comprises performing the query over at least one of at least a portion of the first hierarchical structure and at least a portion of the second hierarchical structure; and
   providing, via the one or more computing devices, a representation of at least a portion of the first data set and at least a portion of the second data set, based upon, at least in part, the query results set, wherein at least one of the first data set and the second data set include one or more files that make up, at least in part, a website, and wherein providing the representation of at least a portion of the first data set and at least a portion of the second data set comprises substituting at least a portion of the second data set for at least a portion of the first data set.

2. The method of claim 1, wherein the second data set further comprises a project identifier associated with at least one of the second data set and the second hierarchical structure.

3. The method of claim 1, wherein at least a portion of the second data set is included within at least a portion of the first hierarchical structure.

4. The method of claim 3, wherein the second data set further comprises a project identifier associated with the second data set.

5. The method of claim 3, wherein performing the query over at least a portion of the first data set and at least a portion of the second data set comprises performing a query over the first hierarchical structure.

6. The method of claim 3, wherein substituting at least a portion of the second data set for at least a portion of the first data set comprises filtering at least a portion of the first data set and at least a portion of the second data set.

7. The method of claim 1, wherein providing the representation of the at least a portion of the first data set and the at least a portion of the second data set includes rendering at least a portion of a website defined, at least in part, by the query results set.

8. The method of claim 1, wherein at least one of the first data set and the second data set include one or more files that correspond one or more webpage elements including at least one of: a menu, a frame, text, and a graphic.

9. A computer program product residing on a computer readable medium having a plurality of instructions stored thereon which, when executed by a processor, cause the processor to perform operations comprising:
   identifying a first data set having a first hierarchical structure;
   identifying a second data set, wherein the second data set represents a modification of at least a portion of the first data set, and wherein the second data set has a second hierarchical structure, at least a portion of the second hierarchical structure corresponding to at least a portion of the first hierarchical structure;
   performing a query over at least a portion of the first data set and at least a portion of the second data set, thereby generating a query results set, wherein performing the query over at least a portion of the first data set and at least a portion of the second data set comprises performing the query over at least one of at least a portion of the first hierarchical structure and at least a portion of the second hierarchical structure; and
   providing a representation of at least a portion of the first data set and at least a portion of the second data set, based upon, at least in part, the query results set, wherein at least one of the first data set and the second data set include one or more files that make up, at least in part, a website, and wherein providing the representation of at least a portion of the first data set and at least a portion of the second data set comprises substituting at least a portion of the second data set for at least a portion of the first data set.

10. The computer program product of claim 9, wherein the second data set further comprises a project identifier associated with the second hierarchical structure.

11. The computer program product of claim 9, wherein at least a portion of the second data set is included within at least a portion of the first hierarchical structure.

12. The computer program product of claim 11, wherein the second data set comprises a project identifier associated with the second data set.

13. The computer program product of claim 11, wherein the instructions for performing the query over at least a portion of the first data set and at least a portion of the second data set comprise instructions for performing a query over the first hierarchical structure.

14. The computer program product of claim 11, wherein substituting at least a portion of the second data set for at least a portion of the first data set comprises filtering at least a portion of the first data set and at least a portion of the second data set.

15. A computing system comprising:
   at least one processor;
   at least one memory architecture coupled with the at least one processor;

a first software module executed on the at least one processor and the at least one memory architecture, wherein the first software module is configured to identify a first data set having a first hierarchical structure;

a second software module executed on the at least one processor and the at least one memory architecture, wherein the second software module is configured to identifying a second data set, wherein the second data set represents a modification of at least a portion of the first data set, and wherein the second data set has a second hierarchical structure, at least a portion of the second hierarchical structure corresponding to at least a portion of the first hierarchical structure;

a third software module executed on the at least one processor and the at least one memory architecture, wherein the third software module is configured to perform a query over at least a portion of the first data set and at least a portion of the second data set, thereby generating a query results set, and wherein the third software module configured to perform the query over at least a portion of the first data set and at least a portion of the second data set is further configured to perform the query over at least one of at least a portion of the first hierarchical structure and at least a portion of the second hierarchical structure; and a fourth software module executed on the at least one processor and the at least one memory architecture, wherein the fourth software module is configured to provide a representation of at least a portion of the first data set and at least a portion of the second data set, based upon, at least in part, the query results set, wherein at least one of the first data set and the second data set include one or more files that make up, at least in part, a website, and wherein the fourth software module configured to provide the representation of at least a portion of the first data set and at least a portion of the second data is further configured to substitute at least a portion of the second data set for at least a portion of the first data set.

16. The computing system of claim 15, wherein the second data set further comprises a project identifier associated with at least one of the second data set and the second hierarchical structure.

17. The computing system of claim 15, wherein at least a portion of the second data set is included within at least a portion of the first hierarchical structure.

18. The computing system of claim 17, wherein the second data set further comprises a project identifier associated with the second data set.

19. The computing system of claim 17, wherein the third software module configured to perform the query over at least a portion of the first data set and at least a portion of the second data set is further configured to perform the query over the first hierarchical structure.

20. The computing system of claim 17, wherein the fourth software module configured to provide the representation of at least a portion of the first data set and at least a portion of the second data and further configured to substitute at least a portion of the second data set for at least a portion of the first data set is further configured to filter at least a portion of the first data set and at least a portion of the second data set.

* * * * *